Feb. 24, 1970    M. AMON ET AL    3,497,696
STAR TRACKER ASSEMBLY USING MANGIN MIRROR AND
FIELD SCANNING DEVICE
Filed Oct. 28, 1966    4 Sheets-Sheet 1
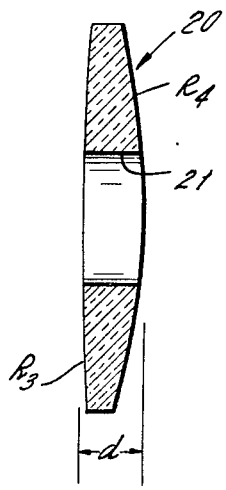
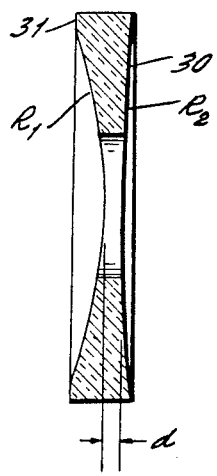
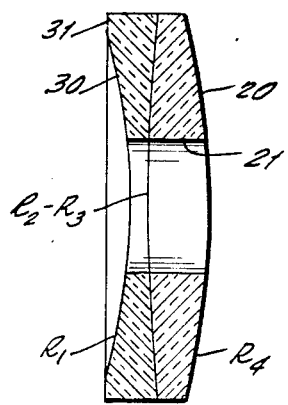
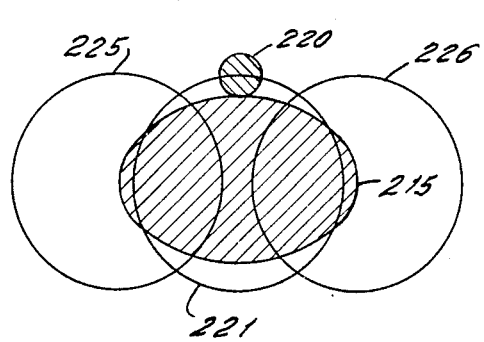
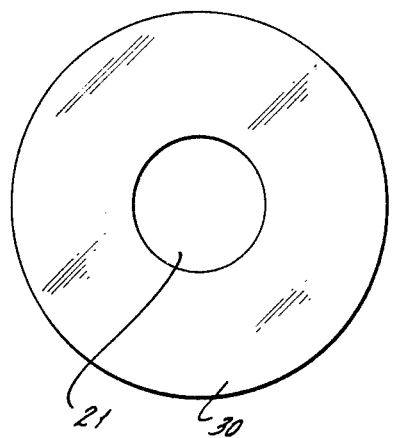
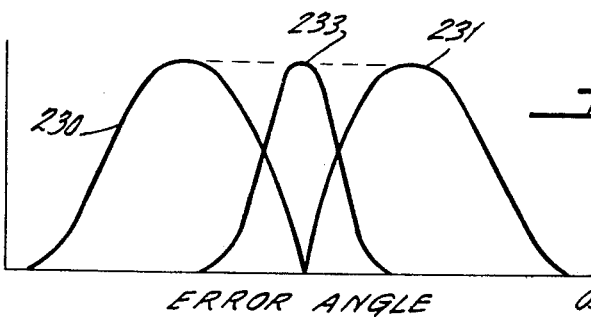
INVENTORS
MAX AMON
GEORGE L. BENDER
SEYMOUR ROSIN
BY
OSTROLENK, FABER, GERB & SOFFEN
ATTORNEYS

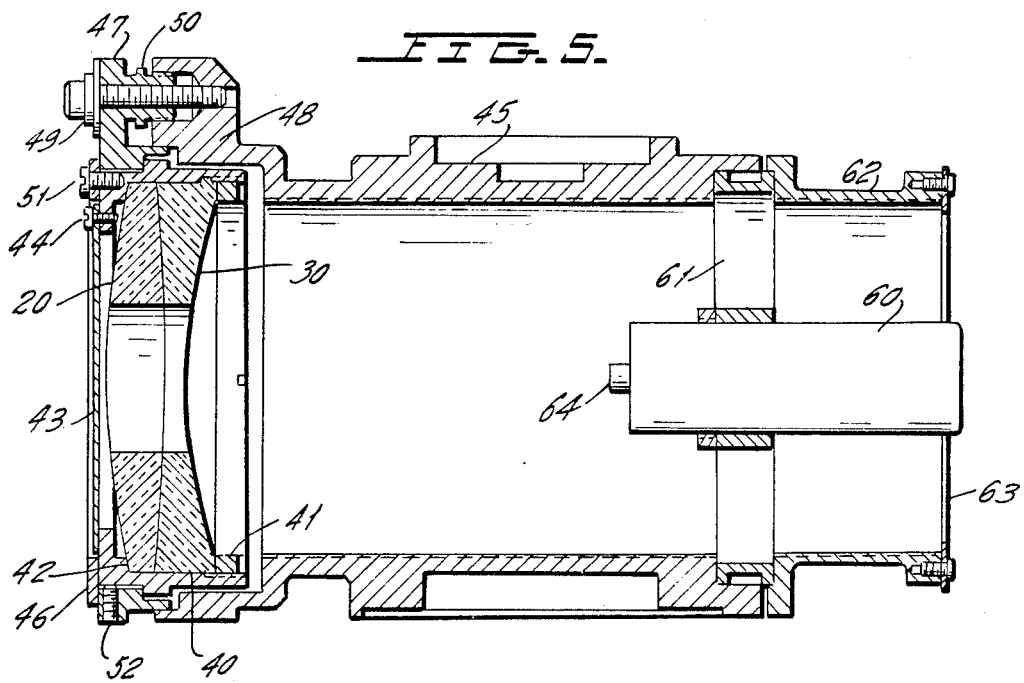
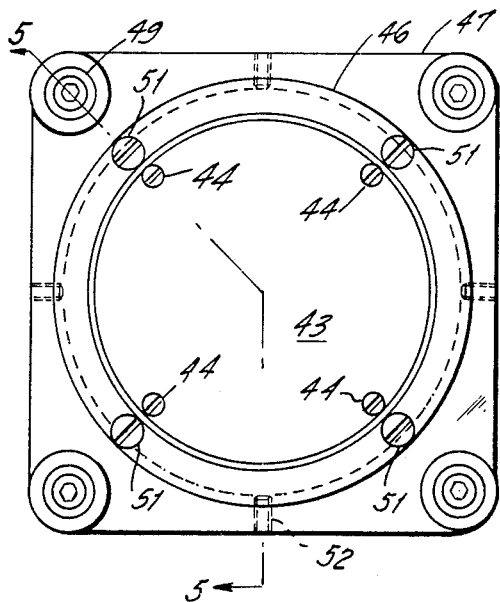
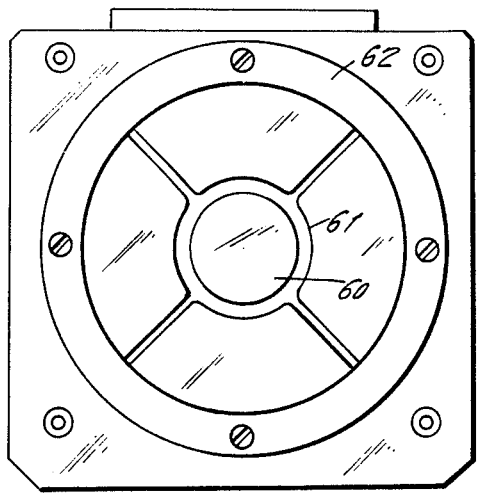
INVENTORS
MAX AMON
GEORGE L. BENDER
SEYMOUR ROSIN
BY
OSTROLENK, FABER, GERB & SOFFEN
ATTORNEYS

INVENTORS
MAX AMON
GEORGE L. BENDER
SEYMOUR ROSIN

BY OSTROLENK, FABER, GERB & SOFFEN
ATTORNEYS

INVENTORS
MAX AMON
GEORGE L. BENDER
SEYMOUR ROSIN
BY
OSTROLENK, FABER, GERB & SOFFEN
ATTORNEYS

United States Patent Office 3,497,696
Patented Feb. 24, 1970

3,497,696
STAR TRACKER ASSEMBLY USING MANGIN
MIRROR AND FIELD SCANNING DEVICE
Max Amon, Woodmere, George L. Bender, Sayville, and
Seymour Rosin, Massapequa Park, N.Y., assignors to
Kollsman Instrument Corporation, Elmhurst, N.Y., a
corporation of New York
Filed Oct. 28, 1966, Ser. No. 590,345
Int. Cl. G01j 1/20
U.S. Cl. 250—203   7 Claims

ABSTRACT OF THE DISCLOSURE

A compact star tracking device capable of defining an image spot having a diameter of less than 0.0005 inch is provided. A mirror structure is mounted interiorly and at one end of a tubular sun shield. A scanning device is mounted within the tubular sun shield coaxially with the mirror structure with the photosensitive surface of a silicon photosensor facing the mirror. The photosensitive surface is spaced axially from the mirror so that the image spot of the mirror is formed in a plane of the photosensitive surface.

---

This invention relates to star tracker devices, and more specifically relates to a novel optical system using a Mangin mirror in combination with a small volume light scanning structure.

Star trackers are well known for navigational purposes where devices capable of operation either at night or in the daytime will point a telescope toward a selected star (or other suitable radiation source), and will generate error signals when they deviate from the star. A suitable servo system can then keep the telescope aimed directly toward the star which can serve as a continuous navigational reference.

Many scanning structures have been proposed for use in such tracking systems which include silicon cells, or the like, as the photosensitive element upon which the star image is directed. Typical scanning devices of this type are disclosed in U.S. Patent No. 3,287,562, filed Feb. 28, 1964, entitled "Photosensitive Scanning Means for Rotating an Image With Respect to a Light Modulator," issuing Nov. 22, 1966 in the name of James J. Connors, Jr. et al., and U.S. Patent No. 3,449,587, filed Feb. 11, 1965, entitled "Fibre Optic Scanner for Navigational Instruments" issuing June 10, 1969 in the name of John W. Barnes, each assigned to the assignee of the present invention.

An important requirement for the light image reaching the sensor of such devices is that the spot size or star image diameter be preferably less than 0.0005 inch. Considerable difficulty has been experienced in the past in obtaining this small a star image while keeping the physical size of the optical equipment relatively small. For example, refractive telescope designs have produced, at best, an image of 0.0020 inch over the spectral range of a silicon cell, (0.6 to 1.1$\mu$) mainly due to chromatic aberration.

The double reflecting system is faced with problems of high background noise and sunlight falling directly on the cell when the system is used as a daytime tracker. This could be prevented by light shielding tubes, but would require a larger receiving aperture. Attaching a sun shield will also cause the telescope to substantially increase in size.

In accordance with the present invention, a single reflecting system incorporating a Mangin mirror is combined with a scanner means having sufficiently small size to permit its mounting in the single reflection light path.

Thus, the entire telescope comprises a relatively short sun shield having a Mangin system at the rear thereof. The scanning system is then contained centrally within the sun shield tube where its relatively small size leaves a large annular area for the collection of light at the Mangin mirror which is reflected forwardly to the scanner. The star image at the focal plane of the mirror and at the input point to the scanner will have the extremely small diameter of less than 0.0005 inch, thereby making it possible to efficiently use silicon cell-type sensors in the scanning equipment.

In comparing the use of the Mangin mirror to other types of light collectors, it was found that the Mangin mirror, in combination with small volume scanning structures, provides optimum performance. The mirror design itself is such as to correct for spherical aberration and primary color in order to keep spot size at a minimum.

The Mangin mirror has the following advantages as compared to a refractive-type system:
(1) Smaller spot size.
(2) Increased spectral response.
(3) Greater efficiency.
(4) Better off-axis performance.
(5) No front element scattering.
(6) Ease of manufacture.
(7) Ease of alignment.
(8) Less expensive.

As compared to the Maksutov type system with color correction, the Mangin mirror retains the following advantages:
(1) It is more compact.
(2) It uses a rear surface mirror.
(3) No front element scattering.
(4) Increased spectral response.
(5) Ease of alignment.

Finally, when comparing the Mangin mirror system of the novel invention to a parabolic mirror, the Mangin mirror system has the following advantages:
(1) Better off-axis performance.
(2) Simplicity of manufacture.
(3) Rear surface mirror.
(4) Less expensive.
(5) Color corrected.

In general, when the system of the invention is used with the $f$ number lower than $f/2$, the Mangin mirror design offers the smallest possible spot size of any system presently known.

Accordingly, a primary object of this invention is to provide a novel star tracker system having a reduced physical size.

Another object of this invention is to provide a novel light collection system having the smallest possible star image diameter for use with silicon cell type sensing devices.

A further object of this invention is to provide a novel combination of a Mangin mirror and a small volume star scanning device which can be interposed between the mirror and the light source and permit sufficient light to reach the collecting mirror for operation of the scanning device.

A further object of this invention is to provide a novel telescope system for light tracking devices which can be used during the day.

Yet another object of this invention is to provide a novel telescope system for star trackers which forms a star image having a diameter less than 0.0005 inches.

These and other objects of this invention will become apparent from the following description when taken in connection with the drawings, in which:

FIGURE 1 is a side cross-sectional view of the mirror lens of the Mangin mirror used in accordance with the present invention.

FIGURE 2 is a cross-sectional view of the collector lens of the Mangin mirror of the present invention.

FIGURE 3 is a cross-sectional view of the Mangin mirror assembly using the elements of FIGURE 1 and 2.

FIGURE 4 is a front view of the assembly of FIGURE 3.

FIGURE 5 is a cross-sectional view of the telescope using the Mangin mirror assembly of FIGURE 3 in combination with a star image scanning structure, and is a cross-sectional view of FIGURE 6 taken across the lines 5—5 in FIGURE 6.

FIGURE 6 is a left-hand side view of the telescope assembly of FIGURE 5.

FIGURE 7 is a right-hand side view of the telescope assembly of FIGURE 5.

FIGURE 14 illustrates the manner in which the star image in FIGURE 13 is rotated about the surface of the elliptical detector of FIGURE 13.

Figure 13:
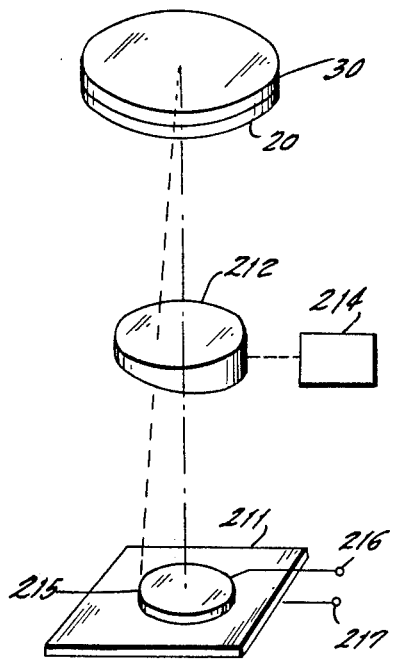
FIGURE 13 is a second embodiment of scanning equipment which is used in FIGURES 5 and 8.

FIGURE 15 graphically illustrates the operation of FIGURES 13 and 14.

Referring first to FIGURES 1 through 4 which illustrate the details of the novel Mangin mirror design, the mirror lens is a positive lens 20 and is shown in FIGURE 1 to comprise a glass disk 20 having a central opening 21 therein. The maximum diameter of disk 20 is approximately 2.875 inches while the inner diameter of opening 21 is approximately 1.062 inches. The maximum thickness of lens 20 is about .452 inches, with the radii of the opposing spherically curved surface as indicated by $R_3$ and $R_4$ being respectively +17.857 inches and −5.950 inches. The outer rim of the lens has a total thickness of about .142 inches. The material selected for lens 20 is an optical glass meeting the specification of Jan-G-174 and is Grade B fine annealed. The rear surface 20 is then silvered by evaporation to insure a minimum of 98% reflectivity at 5893 A. The silver is overcoated with Inconel deposited to a thickness of 300 A. and painted with black enamel.

A negative collector lens 30 is shown in FIGURE 2, and is made of a glass meeting the same specification as lens 20 of FIGURE 1 and with a similar internal and external diameter. The radii $R_1$ and $R_2$ of collector lens 30 are −3.916 inches and +17.857 inches, respectively, with the exterior diameter thickness being .452 inches and the interior diameter thickness being .142 inches. An antireflection coating is applied to surface $R_1$ in accordance with the requirements of Jan-F-675 for maximum transmission at 0.8 micron. The left-hand face of lens 30 then has a flattened portion 31 formed therein to bring the outer periphery thickness to about .434 inches.

The two lenses are then assembled by cementing with a MI-10-2a cement (Frankfurt Arsenal Cement FXS-1057) in the manner illustrated in FIGURES 3 and 4. In the assembled mirror of FIGURES 3 and 4, the mirror will have an $f$ number of 1.45, a clear aperture of 2.5, and will develop a spot size of .00030 in diameter. The mirror structure is then mounted within a telescope, for example, in the manner illustrated in FIGURES 5, 6 and 7 in combination with a suitable scanning structure which will be described more fully hereinafter.

Referring now to FIGURES 5, 6 and 7, the mirror assembly of elements 20 and 30 is captured in a dished support 40 which receives a threaded lock ring 41 to lock the mirror assembly against shoulder 42. A cover plate 43 is fastened to the support member 40 by suitable screws such as screw 44. This unit is then held as a subassembly within the tubular housing 45 by means of a retaining ring 46, which bears against an adaptor bottom 47 which is bolted to the enlarged flange 48 of tube 45. The bolts, such as bolt 49 passing through bushing, such as bushing 50, are threaded into suitable threaded openings in the flange 48. A universal adjustment of the alignment of mirrors 20 and 30 is then made possible by the adjustment screws, such as adjustment screw 51, which is carried in retaining ring 46 and set screws, such as set screw 52, carried in the adaptor bottom 47. The scanning assembly 60 is then supported on the axis of mirrors 20 and 30 by the spider support 61 which is suitably secured between the end of support tube 45 and sun shade 62. An aperture stop 63 may extend across at least a portion of the opening in the end of sun shade 62, as shown.

In accordance with the invention, the combination of the Mangin mirror, comprised of elements 20 and 30, with a small volume scanning device 60, permits the use of the single type reflection system. That is, the small volume scanner 60 has a diameter about equal to opening 21 in lenses 20 and 30 so that a larger annular opening is available between scanner 60 and shield 62 for passage of light to the mirror. The radiation of the object to be tracked then reaches the mirror through the annular region surrounding scanner 60 with the mirror system 20–30 and focuses a very small image of the object being tracked on the input end 64 of the scanner. In particular and as will be described later, the image diameter applied to end portion 64 will be less than 0.0005 inches in diameter whereupon photosensing devices, such as silicon cells, can be advantageously used in the scanning structure.

Figure 8:
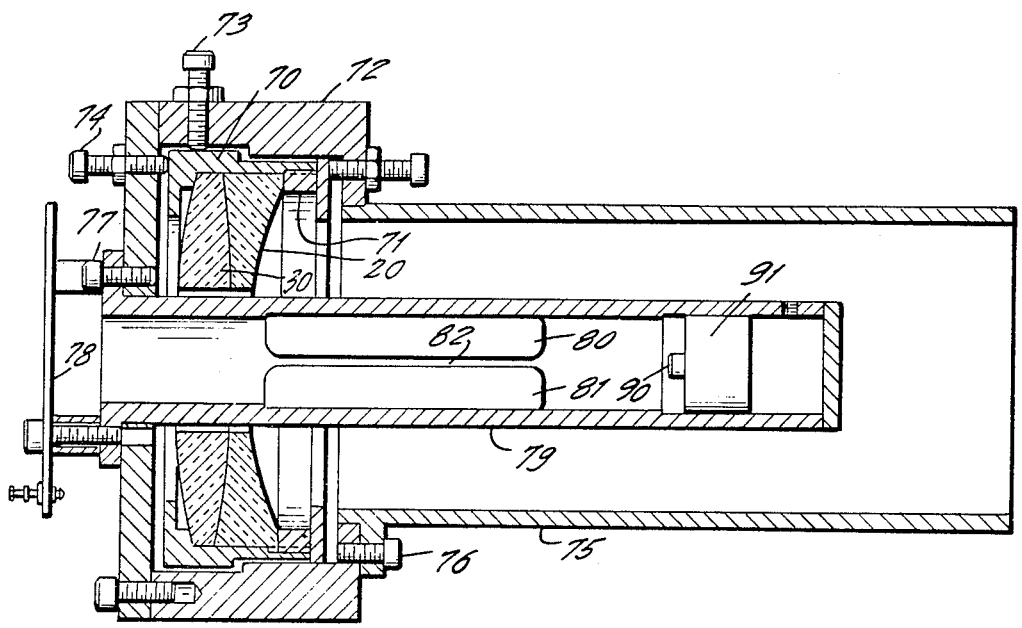
FIGURE 8 is a cross-sectional view of a second embodiment of the invention combining a Mangin mirror system and a small volume star tracker device, and is a cross-sectional view of FIGURE 9 taken across the section lines 8—8 in FIGURE 9.
Figure 9:
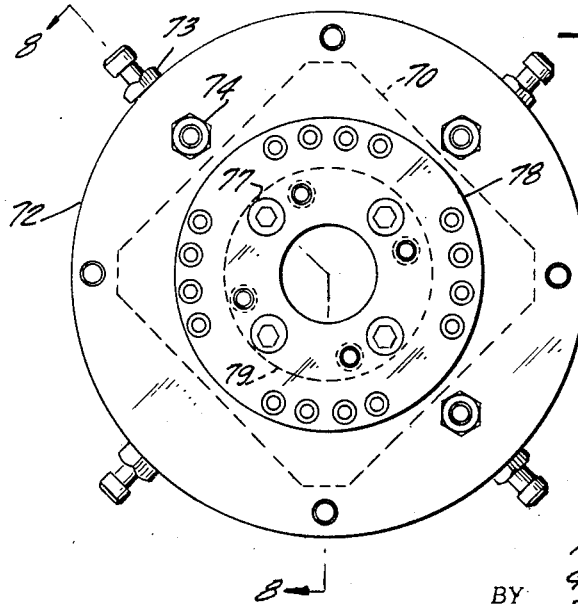
FIGURE 9 is a left-hand side view of the telescope assembly of FIGURE 8.

While FIGURE 5 illustrates the novel combination with the scanner 60 suspended within tube 45 by a spider, other types of mechanical suspensions can be used in accordance with the invention. Thus, as shown in FIGURES 8 and 9, Mangin mirror 20–30 is again carried in a suitable dished member 70 and locked in place by the locking ring 71. The attitude of mirror 20–30 with respect to lens housing 72 is controlled by adjustment screws, such as screws 73 and 74, with the lens housing 72 being secured to an outwardly extending flange of the outer housing tube 75 as by securing bolt 76. A series of bolts, such as bolt 77, then secures an electrical terminal board 78 and an internal tube 79 to the main assembly. The tube 79 then has a plurality of windows therein, such as windows 80 and 81 which are joined by four thin webs, such as web 82, to permit passage of reflected light from mirror 20–30 toward the photosensitive end 90 of the scanner assembly 91 which is contained in the end of tube 79. It will again be apparent that light entering along the axis of tube 75 and passing through the open annular region between tubes 79 and 75 will be reflected by the mirror 20–30 through the windows, such as windows 80–81 in tub 79 to the photosensing input end 90 of the scanning device 91.

Once again the novel system is extremely compact and will inherently be of light weight since the small spot diameter made possible by mirror 20–30 permits the use of the compact type of scanning device 91.

Figure 10:
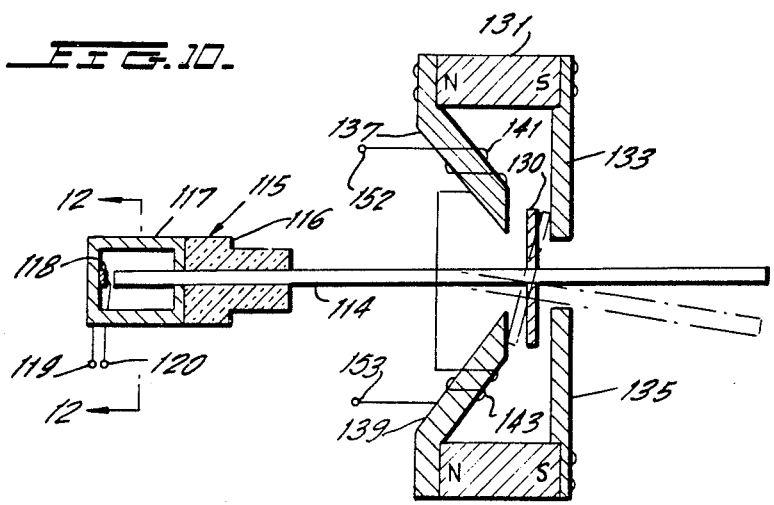
FIGURE 10 is a cross-sectional view of an optical fibre scanner structure which could be used as the small volume scanner of FIGURES 5 or 8.
Figure 11:
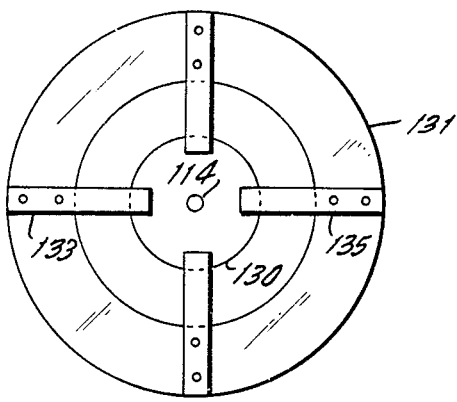
FIGURE 11 is a right-hand side view of the scanner of FIGURE 12.
Figure 12:
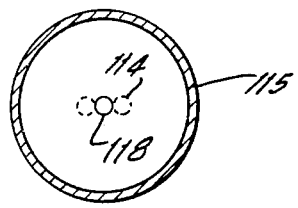
FIGURE 12 is a cross-sectional view of FIGURE 10 taken across the section line 12—12 in FIGURE 10, and particularly illustrates the excursion of the end of the optical fibre with reference to the stationarily positioned photosensing device.

FIGURES 10, 11 and 12 illustrate one type of scanning structure which could be used for the scanning structures 60 of FIGURE 5 and 91 of FIGURE 8, this scanning structure being of the type described in U.S. Patent No. 3,449,587 mentioned above. Referring to FIGURES 10, 11 and 12, the scanning structure is contained in a single, relatively small diameter package which includes a support means 115 comprised of a metallic housing 116 which is rigidly secured to an optical fibre 114. A hermetically sealed housing 117 is then secured to the left-hand end of metallic body 116 and contains therein a suitable photosensing means 118 which could, for example, be a silicon photodiode of any desired type. The output leads of photodiode 118 are then connected to terminals 119 and 120 which provide electrical signals related to the modulation of the light source which is to be tracked. Thus, as illustrated in FIGURE 12, the optical fibre 114 will be moved through a total excursion, by means to be described hereinafter, of the order of twice the diameter of optical fibre 114. The optical fibre 114 may be formed of a fibre of high index glass, clad with a low index glass, and could have a length of about two inches and a diameter of 0.02 inches.

An oscillating system for causing fibre 114 to oscillate between the dotted line positions shown in FIGURES 10 and 12 are illustrated in detail in FIGURES 10 and 11. Thus, the oscillating system includes a magnetic disk 130 which is directly secured to the optical fibre 114. The drive system will then effect motion of disk 130 and thus fibre 114, and includes a permanent magnet 131 having rear pole pieces 133 and 135 and front pole pieces 137 and 139 secured to magnet 131 in any desired manner. A second set of similar pole pieces then extend perpendicularly, as shown in FIGURE 11, as described in detail in above noted U.S. Patent No. 3,449,587. Pole pieces 137 and 139 then carry windings 141 and 143, respectively, having terminals 152 and 153, respectively, which are connected to a suitable A-C source (not shown). Windings 141 and 143 are then wound in such a direction that when the flux generated in one winding opposes the flux of magnet 131, the flux in the other magnet will be in the same direction as the flux in magnet 131. Therefore, an oscillation motion will be imparted to disk 130, thereby to oscillate the end of fibre 114.

In operation, and assuming that scanning is desired only in one direction so that the optical fibre 114 will oscillate in a plane with simple harmonic motion, the A-C source connected to terminals 152 and 153 will oscillate fibre 114 at some predetermined frequency which would be somewhat lower than the natural resonance frequency of fibre 114 and disk 130. The free end of optical fibre 114, which corresponds to end 90 of scanner 91 of FIGURE 8 and end 64 of scanner 60 of FIGURE 5 will, therefore, scan within the image plane of mirror 20–30. If the image of the object being tracked lies on the optical axis or rest position of fibre 114, the image transmitted along fibre 114 will have an intensity modulation frequency which is twice the frequency of the scanning motion of fibre 114, and this double frequency output signal will appear at terminals 119 and 120. If, however, the image moves away from the optical axis or the rest axis of fibre 114, then the light transmitted along optical fibre 114 to the photosensitive element will be modulated by a frequency equal to the scanning frequency of optical fibre 114. Note that the direction in which the image is moved away from the center or rest position of fibre 114 will be determined by the phase of the modulation frequency signal applied to photosensitive means 118.

Therefore, the novel system, when used for single axis scanning, will deliver an identifiable double frequency signal when the image is properly aligned along the axis of the light scanning means and will deliver scanning frequency signals having a phase related to the direction of the displacement of the optical image from the rest axis of fibre 114 when the optical image is displaced.

FIGURES 13, 14 and 15 illustrate the manner in which a second type of scanning apparatus could be used as scanner 60 in FIGURE 5, or as the scanner 91 in FIGURE 8, with the small spot image developed by mirror 20–30 making possible the use of this type scanner with maximum efficiency. The system of FIGURES 13, 14 and 15 correspond to the device disclosed in the above noted U.S. Patent No. 3,287,562, and comprises the use of an optical wedge 212 which is interposed between the reflected light of mirror 20–30 and a detector 211. The optical wedge 212 is rotated about its axis and the optical axis of mirror 20–30 by a suitable rotating means such as motor 214. This causes the image of the source being tracked to rotate about a circular path with respect to detector 211 which carries thereon an elliptically shaped silicon photodetector 215 having output leads 216 and 217. Thus, as the image of the source is circularly rotated by wedge 212, the image will periodically invade elliptically shaped photosensitive area 215. Note that other non-circular shapes could be used for detector 215 with the elliptical shape being selected for purposes of illustration.

FIGURE 14 illustrates the star image 220 as being rotated by wedge 212 around a circular path 221. FIGURE 15 illustrates the error signals which will be generated at terminals 216 and 217 for misalignment between the axis of the scanning circle 221 with the axis of photodetector 215 and thus the optical axis of mirror 20–30. Thus, if the scanning circle 221 drifts to the left and to the position shown by circle 225, the image 220 passes through the photosensor area only once per cycle so that an error signal shown by curve 230 in FIGURE 15 is generated which is at the frequency of rotation of the image. Should the scanning circle now drift to the right in FIGURE 14 to the circle 226, the error signal will be that of curve 231 in FIGURE 15 which is again at the frequency of rotation of image 20, but with the phase reversed from that of curve 230. Once, however, the target circulates about radius of circle 221 and about the center of photosensitive area 215, the double frequency signal 233 of FIGURE 15 will be generated, this signal increasing in magnitude as the axis of the circle comes closer to alignment with the center of photosensitive region 215. Thus, the system of FIGURES 13 and 14 again provides an output whereby the summing of signals 230, 231 and 233 will provide a presence signal of the image in the field of view, while the isolation of the error signals in suitable filter circuits will provide electrical output means for nulling purposes by determining the alignment error of the telescope to the line of sight to the image being tracked. It will, of course, be apparent that in applying the system of FIGURES 13 and 14 to the scanners 60 of FIGURE 9 and 91 of FIGURE 8 the surface of cell 215 would be contained in the focal plane of the mirror 20–30, corresponding to the schematically illustrated photosensitive end portions 64 and 90 of FIGURES 5 and 8, respectively.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination; a Mangin mirror and a light scanning structure; said light scanning structure including a silicon photosensor; said Mangin mirror defining an image spot having a diameter less than 0.005 inches; said Mangin mirror mounted coaxially with said silicon photosensor and being axially spaced therefrom; said silicon photosensor having a photosensitive surface facing said mirror; said image spot of said Mangin mirror formed in the plane of said photosensitive surface.

2. The combination of claim 1 wherein said light scanning structure is interposed between said Mangin mirror and a light source to be observed by said Mangin mirror; said light scanning structure having a diameter smaller than said Mangin mirror whereby an annular light area from said light source falls on said Mangin mirror.

3. A star tracking structure comprising, in combination, a telescope and a scanning device; said telescope containing a single reflection mirror structure, having a central axial opening having a given diameter; said scanning device including photosensing means responsive to the focused image of light of a remote light source collected by said single reflection mirror structure; and support means for supporting both said single reflection mirror structure and scanning device; said support means including a hollow tube structue concentric with said single reflection mirror structure and said scanning device; said reflection mirror structure mounted adjacent one end of said tube structure; said tube structure having an open opposite end; said hollow tube structure having an interior diameter greater than the diameter of said mirror structure; said scanning device having a diameter approximtaely equal to the diameter of said central axial opening in said mirror structure; securing means for securing said scanner device within the interior of said tube structure coaxially with said mirror structure and axially spaced from said mirror structure; the outer diameter of said scanning device spaced from the interior diameter of said tube structure and defining an annular opening for permitting light to pass from said open opposite end thereof toward said mirror structure; said photosensing means of said scanning device facing toward said mirror structure; a second hollow tube structure for mounting said scanning device; said second hollow tube structure extending through said axial opening in said mirror structure; said scanning device mounted in the interior of said second hollow tube structure; said second hollow tube structure having longitudinally directed slots through the walls thereof between said scanning device and mirror structure.

4. The device as set forth in claim 3 wherein said single reflection mirror structure defines a Mangin mirror.

5. The device as set forth in claim 4 wherein said photosensing means includes a silicon photosensor; said Mangin mirror focusing light upon said silicon photosensor and forming a light spot on said photosensor having a diameter of less than 0.0005 inches.

6. A star tracking structure comprising, in combination, a telescope and a scanning device; said telescope containing a single reflection mirror structure, said mirror structure comprising a first and positive lens, a second and negative lens, each of said lenses having first and second surfaces of spherical curvature, the first surface of the first lens being adjacent the second surface of the second lens, the second surface of the first lens having a reflective coating thereon; said scanning device including photosensing means responsive to the focused image of light of a remote light source collected by said single reflection mirror structure; and support means for supporting both said single reflection mirror structure and scanning device; said support means including a hollow tube structure concentric with said single reflection mirror structure and said scanning device; said reflection mirror structure mounted adjacent one end of said tube structure; said tube structure having an open opposite end; said hollow tube structure having an interior diameter greater than the diameter of said mirror structure; securing means for securing said scanning device within the interior of said tube structure coaxially with said mirror structure and axially spaced from said mirror structure; the outer diameter of said scanning device spaced from the interior diameter of said tube structure and defining an annular opening for permitting light to pass from said open opposite end thereof toward said mirror structure; said photosensing means of said scanning device facing toward said mirror structure.

7. The device as set forth in claim 6 wherein said photosensing means includes a silicon photosensor; said mirror structure focusing light upon said silicon photosensor and forming a light spot on said photosensor having a diameter less than 0.0005 inches.

References Cited

UNITED STATES PATENTS

| | | | |
|---|---|---|---|
| 2,997,598 | 8/1961 | Gramm | 250—203 X |
| 3,206,608 | 9/1965 | Aulin | 250—203 X |
| 3,326,621 | 6/1967 | De Nygorden | 350—201 X |

JAMES W. LAWRENCE, Primary Examiner

V. LAFRANCHI, Assistant Examiner

U.S. Cl. X.R.

250—83.3, 232, 235; 350—201